No. 874,517. PATENTED DEC. 24, 1907.
C. B. LOWRY.
DIAPHRAGM.
APPLICATION FILED JUNE 2, 1906.

WITNESSES  
INVENTOR  
Cuthbert B. Lowry  
BY  
ATTORNEY

UNITED STATES PATENT OFFICE.

CUTHBERT B. LOWRY, OF LEXINGTON, KENTUCKY.

DIAPHRAGM.

No. 874,517.

Specification of Letters Patent.

Patented Dec. 24, 1907.

Application filed June 2, 1906. Serial No. 319,947.

*To all whom it may concern:*

Be it known that I, CUTHBERT B. LOWRY, of Lexington, in the county of Fayette and State of Kentucky, have invented certain new and useful Improvements in Diaphragms; and I do hereby declare the following to be a full, clear, and exact description of the invention, such as will enable others skilled in the art to which it appertains to make and use the same.

In tanks, retorts, boilers and the like equipped with pressure indicators, more or less difficulty has heretofore been experienced in connection with the pressure diaphragms which are alternately subjected to internal pressures and vacua, as for instance in wood impregnating wherein the retorts are first charged with creosoting compounds under pressure, and then subjected to a vacuum for effecting the removal of the surplus oil.

The object of my invention is to provide a diaphragm which while sensitive to pressure, yet will not break or be damaged when reversely acted upon by the formation of a vacuum.

The invention will be hereinafter fully set forth and particularly pointed out in the claims.

Figure 1:
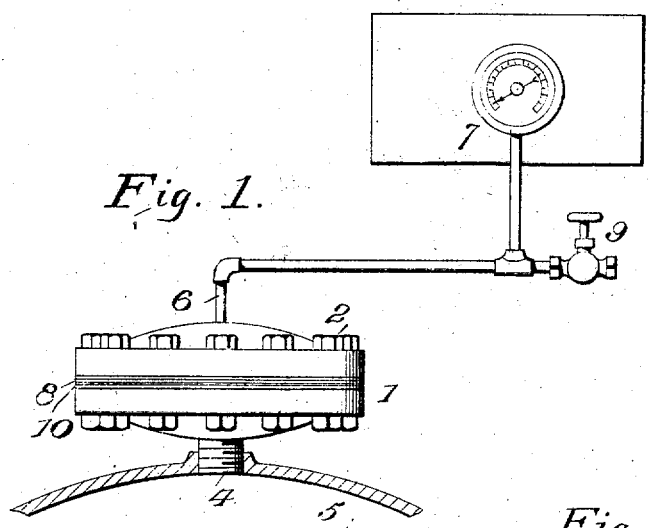
Figure 2:
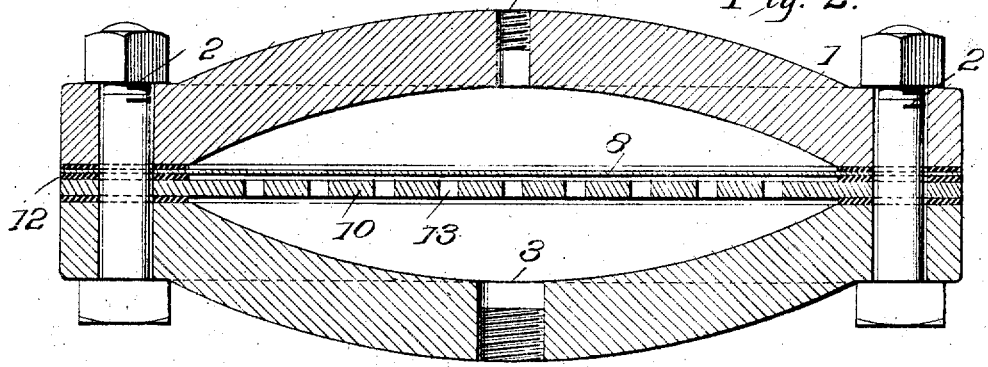
Figure 4:
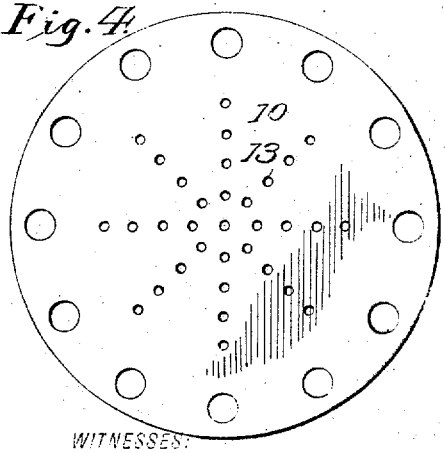
Figure 3:
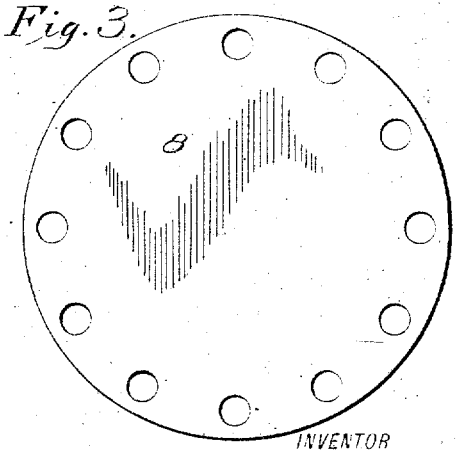

In the accompanying drawings, Figure 1 is a side elevation showing the relative location of the diaphragm to the indicator and a retort. Fig. 2 is a vertical sectional view through the diaphragm. Fig. 3 is a view of the diaphragm removed, and Fig. 4 is a similar view of the stop plate.

Referring to the drawings, 1 designates the casing which is preferably composed of two corresponding plates of concavo-convex formation united by nutted bolts 2 passed through the perforated flanges thereof. One of these plates is formed with a central threaded opening 3 into which fits a pipe 4 leading from the retort, while the other plate has a smaller opening 5 to accommodate a pipe 6 leading to the indicator 7.

8 designates the diaphragm plate which is located within the chamber formed by the opposite concavo faces of the two plates, such plate being held at its edge between the flanges of the casing plates, and for this purpose it is formed with perforations to accommodate bolts 2. Preferably this diaphragm is formed of thin tempered brass, which is best adapted for the purpose, although, if desired, it may be made from other material. The space between the diaphragm and the indicator is usually filled with glycerin, or other fluid, which is ordinarily introduced through the valved-connection 9 opening into a horizontal portion of pipe 6. It is manifest that the pressures within the retort or boiler acting outwardly on the diaphragm will, through the column of glycerin or other fluid, be indicated on the gage of the indicator by the hand thereof, any suitable form of indicator being employed.

10 designates a metallic disk, preferably of boiler plate, located within the pressure side of the diaphragm casing, being separated from the diaphragm by one of the lead gaskets 12 around the edge of the diaphragm and between the edges of the casing plates. This plate is formed with numerous holes or perforations 13 to permit of pressure acting directly upon the diaphragm. The function of this plate, however, is to prevent any undue strain or tension upon the diaphragm when a vacuum is formed within the retort.

It is manifest that upon the creation of a vacuum the flexible portion of the diaphragm plate will be drawn inwardly, but by reason of the juxtaposition of the perforated plate of inflexible material the movement of the diaphragm will be instantly arrested, thereby avoiding breakage thereof or injury thereto.

It is essential, in connection with the impregnating of wood with creosoting compounds, that a metallic diaphragm be employed, since a non-metallic diaphragm would be quickly destroyed by the creosoting compound, and heretofore the use of a metallic diaphragm, and in particular one of tempered brass, has been impracticable because of the shortness of the life thereof consequent upon the alternate creation of pressures and vacua.

I claim as my invention:—

1. The combination with a tank, retort, or the like, and an indicator, of a diaphragm casing interposed between said tank or retort and the indicator, a diaphragm within said casing, and a stop plate spaced from but in close proximity to the diaphragm for limiting the inward movement of the flexible portion thereof upon the creation of a vacuum within such tank or retort, said stop plate having perforations formed therein.

2. The combination with a tank, retort, or the like, and an indicator, of a diaphragm casing interposed between said tank or retort and indicator, a metallic diaphragm within said casing, and a stop plate arranged in close proximity to said diaphragm, between it and the tank or retort, said plate having perforations, and serving to limit the inward movement of the flexible portion of the diaphragm upon the creation of a vacuum within said tank or retort.

3. The combination with a casing composed of two corresponding plates united at their edges, of a metallic diaphragm plate of flexible metal held between said edges, and a perforated disk of inflexible metal also held between said edges, said disk being in close relation to, but spaced apart from, said diaphragm plate.

In testimony whereof, I have signed this specification in the presence of two subscribing witnesses.

CUTHBERT B. LOWRY.

Witnesses:
S. H. FIELDS,
THOS. B. TAYLOR.